US012620171B2

(12) United States Patent     (10) Patent No.:   US 12,620,171 B2

Nayak et al.     (45) Date of Patent:    May 5, 2026

(54) REPRESENTATIONS OF FOOT FEATURES

(71) Applicant: Peridot Print LLC, Palo Alto, CA (US)

(72) Inventors: Vijaykumar Nayak, San Diego, CA (US); Melanie Michelle Shelton, Vancouver, WA (US); Andy Yi-Chih Liao, San Diego, CA (US); Jason M. Kraus, Riverhead, NY (US)

(73) Assignee: PERIDOT PRINT LLC, Palo Alto, CA (US)

( * ) Notice: Subject to any disclaimer, the term of this patent is extended or adjusted under 35 U.S.C. 154(b) by 286 days.

(21) Appl. No.: 18/572,118

(22) PCT Filed: Jun. 14, 2021

(86) PCT No.: PCT/US2021/070704

§ 371 (c)(1),
(2) Date: Dec. 19, 2023

(87) PCT Pub. No.: WO2022/265675

PCT Pub. Date: Dec. 22, 2022

(65) Prior Publication Data

US 2024/0212270 A1     Jun. 27, 2024

(51) Int. Cl.
*G06T 17/00*     (2006.01)
*G06T 7/60*     (2017.01)

(52) U.S. Cl.
CPC ............... *G06T 17/00* (2013.01); *G06T 7/60* (2013.01); *G06T 2207/30004* (2013.01); *G06T 2210/41* (2013.01)

(58) Field of Classification Search
CPC . G06T 17/00; G06T 7/06; G06T 2207/30004; G06T 2210/41; A43D 1/025
See application file for complete search history.

(56) References Cited

U.S. PATENT DOCUMENTS

| | | | |
|---|---|---|---|
| 10,282,914 B1 * | 5/2019 | Tran | A61B 5/1036 |
| 2017/0007160 A1 * | 1/2017 | Latterman | A43D 1/02 |
| 2017/0202724 A1 | 7/2017 | De Rossi et al. | |
| 2018/0253906 A1 | 9/2018 | Tran et al. | |
| 2019/0082779 A1 * | 3/2019 | Miller | A43B 13/386 |

(Continued)

FOREIGN PATENT DOCUMENTS

CN     108741393 A     11/2018

OTHER PUBLICATIONS

"FITFOOT360 in Action—Overview", FIT360 Ltd; copywrite 2021, retrieved at https://www.youtube.com/watch. pp. 13.

(Continued)

*Primary Examiner* — Stephen R Koziol
*Assistant Examiner* — Michael Kim Maiden
(74) *Attorney, Agent, or Firm* — Michael Dryja

(57) ABSTRACT

In some examples, a system receives an input three-dimensional (3D) representation of a foot, and analyzes the input 3D representation of the foot to identify first points corresponding to metatarsal bones of the foot. Based on locations of the first points corresponding to the metatarsal bones, the system identifies a second point corresponding to a heel of the foot, and generates, based on the first points and the second point, a representation of features of the foot.

18 Claims, 7 Drawing Sheets

(56) References Cited

U.S. PATENT DOCUMENTS

2020/0238626 A1* 7/2020 Bleicher ............... B33Y 30/00

OTHER PUBLICATIONS

"Going Beyond Fit; Automated & Human-Centered Custom-Fit Platform," SHAPESHIFT3D, info@shapeshift3d.com; Canada; copywrite 2020; 4 pages.
Schrank, E, S., et al., "Dimensional accuracy of ankle-foot orthoses constructed by rapid customization and manufacturing framework," Department of Veterans Affairs; JRRD, Journal of Rehabilitation Research & Development, vol. 48, No. 1, 2011, pp. 31-42.

* cited by examiner

500

Storage Medium

502
Input Foot Representation Reception Instructions

504
Input 3D Representation Analysis Instructions

506
Heel Point Identification Instructions

508
Foot Feature Representation Generation Instructions

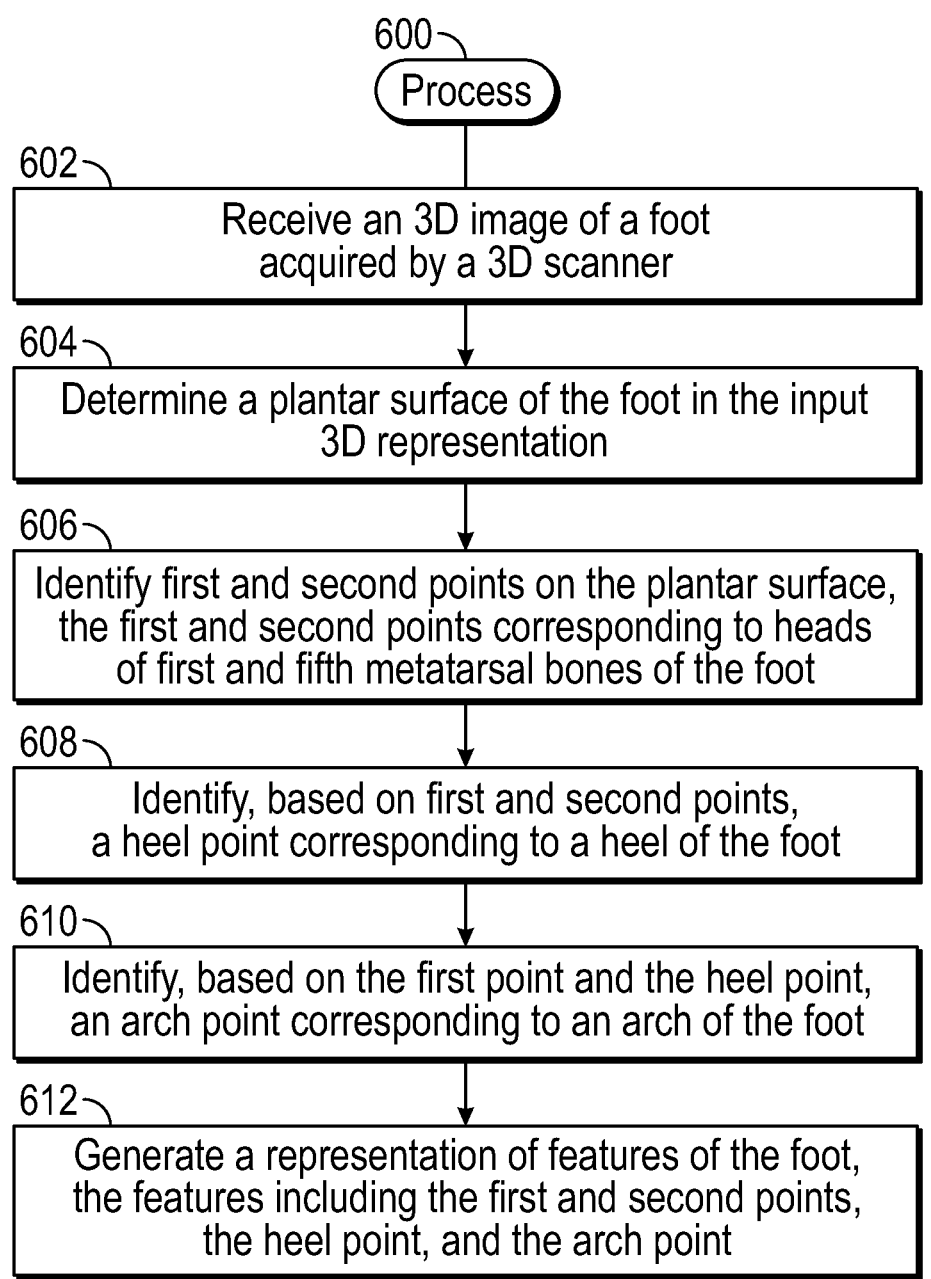

600 — Process

602 — Receive an 3D image of a foot acquired by a 3D scanner

604 — Determine a plantar surface of the foot in the input 3D representation

606 — Identify first and second points on the plantar surface, the first and second points corresponding to heads of first and fifth metatarsal bones of the foot 608 — Identify, based on first and second points, a heel point corresponding to a heel of the foot 610 — Identify, based on the first point and the heel point, an arch point corresponding to an arch of the foot 612 — Generate a representation of features of the foot, the features including the first and second points, the heel point, and the arch point

System

702

Hardware Processor

704

Storage Medium

706

Input Foot Representation Reception Instructions

708

Plantar Surface Determination Instructions

710

Metatarsal Point Identification Instructions

712

Second Point Identification Instructions

714

Output Representation Generation Instructions

REPRESENTATIONS OF FOOT FEATURES

BACKGROUND

A human foot has various features that can be identified for various purposes. For example, features of a particular foot can be used for building footwear that is customized for the particular foot. As another example, features of a foot can be identified for performing a medical diagnosis.

BRIEF DESCRIPTION OF THE DRAWINGS

Some implementations of the present disclosure are described with respect to the following figures.

FIG. 6 is a flow diagram of a process according to some examples; and

Figures 1, 1A:
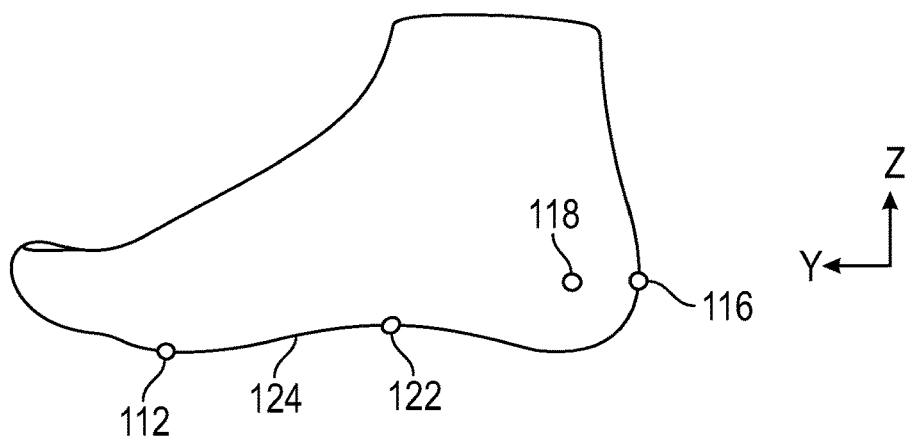
FIG. 1 is a block diagram of an arrangement that includes a foot features representation generation engine according to some examples.
FIG. 1A is a side view of a foot according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, the identification of features of a foot can be based on manual analysis by a human, such as a doctor, a foot specialist, or another person. The identification of features of the foot may be based on a manual assessment of an actual foot of a user, or alternatively, can be based on a manual analysis of a three-dimensional (3D) image of the foot that has been acquired by an image scanner.

Such manual analysis of a foot to identify features can be time-consuming and may produce inaccurate results. For example, if the identification of the features of a foot is being performed as part of building footwear (e.g., customized orthotics, a customized shoe, etc.) for a user, inaccurate feature identification of a foot can lead to the footwear not properly fitting the foot of the user. Also, manual analysis of a foot to identify features may involve experts with special knowledge, such as doctors or foot specialists. Having to involve experts in identifying features for feet of users may slow down production of footwear, since the analyses performed by the experts can become a bottleneck in the footwear production process.

In accordance with some implementations of the present disclosure, an automated engine is provided to analyze a 3D representation of a foot for generating an output representation of features of the foot. The features of the foot include heads of certain metatarsal bones (e.g., the first and fifth metatarsal bones) of the foot, portions of a heel of the foot, and a portion of an arch of the foot, as examples.

A "feature" of a foot represented in the output representation can refer to any part of the foot of interest for a target purpose. The target purpose may include any of the following: building customized footwear (e.g., customized orthotics such as insoles, customized shoes, etc.) for a user, performing a medical diagnosis of an issue experienced by a patient, performing data analytics or machine learning, and so forth.

FIG. 1 is a diagram of an example arrangement that includes a foot features representation generation engine 102 according to some examples of the present disclosure. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The foot features representation generation engine 102 receives an input 3D representation 104 of a foot. Although reference is made to "foot" in the singular sense, it is noted that techniques or mechanisms according to some implementations of the present disclosure can process input representations of multiple feet and can produce output representations of features of multiple feet.

The input 3D representation 104 of the foot can be produced by a 3D scanner 106. The 3D scanner 106 can include an image sensor (e.g., a camera, a 3D depth sensor, etc.) that can acquire a 3D image of a foot. Alternatively or additionally, the 3D scanner 106 can include a different type of scanner, such as a pressure scanner that can reconstruct a 3D representation of a foot from detected pressure points when a foot is engaged with the pressure scanner. The pressure scanner can produce a representation of different pressures corresponding to different parts of the foot.

Based on the input 3D representation 104 of the foot, the foot features representation generation engine 102 produces an output representation 108 of foot features, such as heads of metatarsal bones and heels. In further examples, the foot features can further include a portion of an arch. The metatarsal bones of the foot are the bones at the forefoot that connect the cuneiform bones and cuboid bone of the foot to phalanges of the toes. There are five metatarsal bones, referred to as the first through fifth metatarsal bones. The first metatarsal bone is on the medial side of the foot (the side of the big toe), and the fifth metatarsal bone is on the lateral side of the foot (the side of the small toe). The heads of the metatarsal bones are connected to the cuneiform bones and cuboid bone of the foot.

The heel of the foot is the back part of the heel behind the arch and below the ankle. The heel includes a heel bone (or more formally, the calcaneus bone) at the posterior (rear) side of the foot. Portions of the heel bone of interest include a back heel (which is the most posterior portion of the heel bone), a medial heel (which is the portion of the heel bone on the medial side of the foot), and a lateral heel (which is the portion of the heel bone on the lateral side of the foot).

The arch of a foot is a region of the foot along the bottom of the foot between the ball of the foot and the heel of the foot. The ball of the foot is where the metatarsal bones are located. Generally, the arch is curved upwardly from the bottom of the foot.

As shown in FIG. 1, the foot features representation generation engine 102 identifies various points along a bottom surface corresponding to a sole (or plantar region) of a represented foot 110 (based on the input 3D representation 104 received by the foot features representation generation engine 102).

As used here, a "point" represents a location of an anatomical structure of the foot, such as heads of metatarsal bones, a portion of a heel, a portion of an arch, and so forth. For example, a point can be expressed in a position in 3D space (e.g., X, Y, Z coordinates).

In some examples, the points of the represented foot 110 identified by the foot features representation generation engine 102 include points 112 and 114 corresponding to heads of metatarsal bones of the represented foot 110. More specifically, the point 112 represents a location of the head of the first metatarsal bone, and the point 114 represents a location of the head of the fifth metatarsal bone.

Further points identified by the foot features representation generation engine 102 include points 116, 118, and 120 corresponding to various portions of the heel of the represented foot 110. The point 116 represents the location of the back heel of the represented foot 110, the point 118 represents the location of the medial heel of the represented foot 110, and the point 120 represents the location of the lateral heel of the represented foot 110.

Another point identified by the foot features representation generation engine 102 is a point 122 corresponding to the highest part of the arch 124 along the sole of the represented foot 110. The arch 124 of the represented foot 110 has an upward curve (see also FIG. 1A, which is not to the same scale as FIG. 1). The highest part of the arch 124 is defined in the Z axis, as measured from the bottom of the represented foot 110.

The foot features representation generation engine 102 is able to first identify the points 112 and 114 corresponding to the heads of the first and fifth metatarsal bones. Based on the locations of the points 112 and 114, the foot features representation generation engine 102 is able to determine locations of the points 116, 118, and 120 corresponding to the back heel, the medial heel, and the lateral heel of the represented foot 110. Based on the location of the point 118, the foot features representation generation engine 102 is able to determine the location of the point 122 that is the highest point of the arch 124 of the represented foot 110.

From the identified points 112, 114, 116, 118, 120, and 122, the foot features representation generation engine 102 generates the output representation 108 of foot features. The foot features included in the output generation can include a collection of the points 112, 114, 116, 118, 120, and 122, where the "collection" of the foregoing points can include a subset (less than all) of the points or all of the foregoing points.

Figure 2:
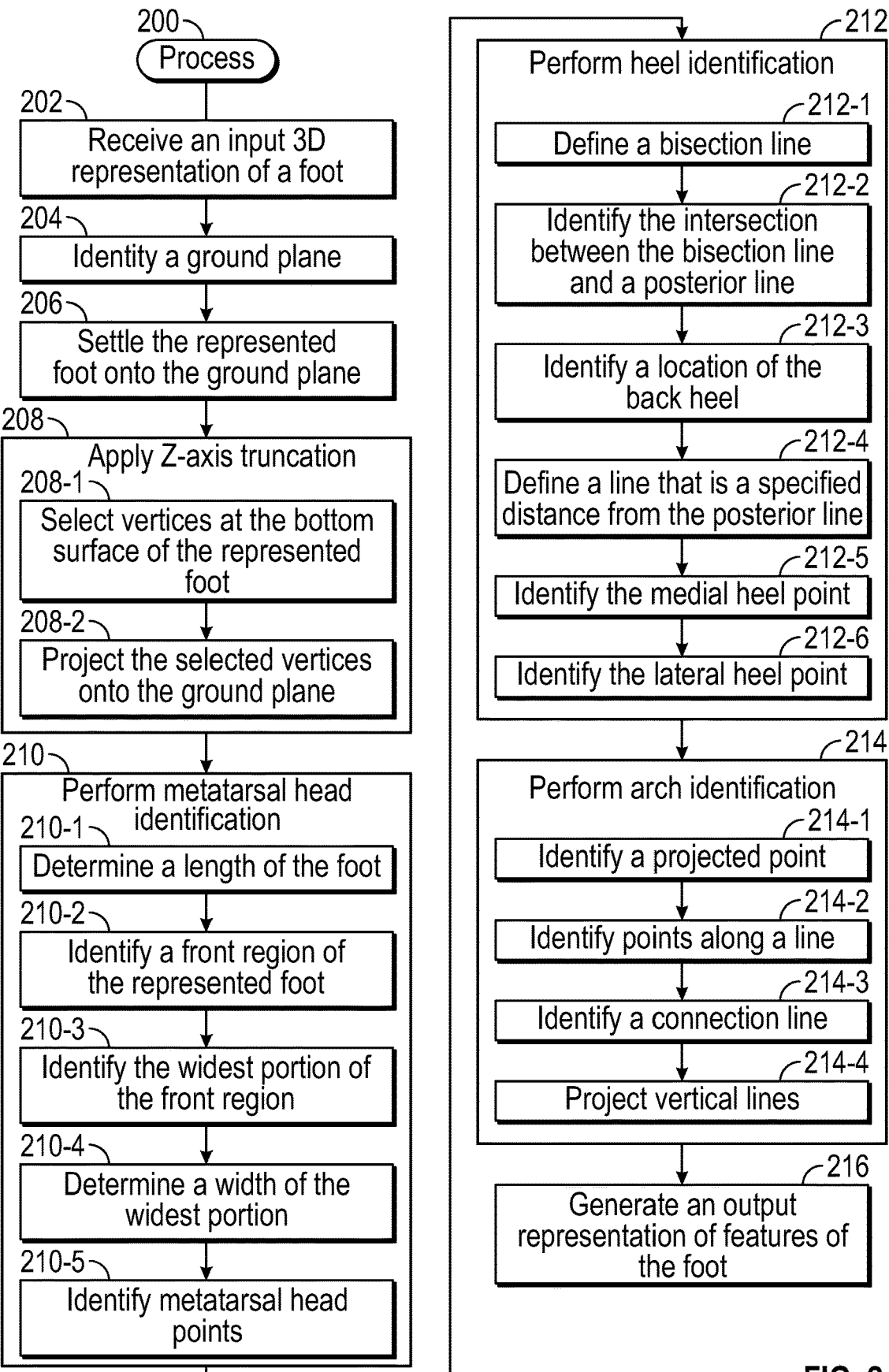
FIG. 2 is a flow diagram of a process of generating a representation of features of a foot, according to some examples.

FIG. 2 is a flow diagram of an example process 200 for generating an output representation (e.g., 108) of foot features, which can be performed by the foot features representation generation engine 102. Although FIG. 2 shows a specific sequence of tasks, it is noted that in other examples, the tasks can be performed in a different order, and some of the tasks can be omitted and/or replaced with other tasks.

The process 200 receives (at 202) an input 3D representation (e.g., 104) of a foot acquired by a 3D scanner (e.g., 106).

The process 200 identifies (at 204) a ground plane for the foot represented in the input 3D representation of the foot. The ground plane is a planar surface that provides a plane of reference for further processing by the foot features representation generation engine 102. It is noted that the input 3D representation of the foot may have an arbitrary orientation that depends on the orientation of the foot relative to a 3D scanner (e.g., 106) when the input 3D representation was acquired.

Figure 3:
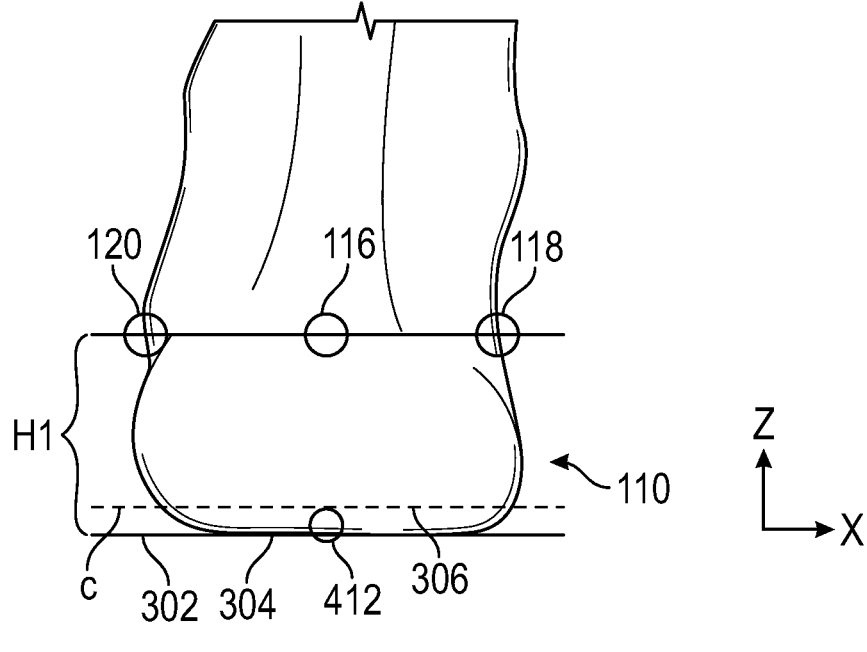
FIG. 3 is a rear view of a foot used for identifying points according to some examples.

The ground plane can be a plane at Z=0 in the X-Y plane. The X-Y plane is a plane parallel to the X and Y axes, and Z=0 refers to a coordinate of 0 (or any other reference position) along the Z axis. In other examples, other ground planes can be defined. An example ground plane 302 is shown in FIG. 3, which is a rear view of the represented foot 110.

In the ensuing discussion, it is assumed that the ground plane 302 is at Z=0. In other examples, the ground plane 302 can be at Z=r, where r is any reference coordinate in the Z axis.

The process 200 settles (at 206) the represented foot 110 onto the ground plane 302. Settling the represented foot 110 onto the ground plane 302 refers to re-orienting (translating and/or rotating) the represented foot 110 such that the lowest portions of the sole of the represented foot 110 rest on the ground plane 302.

Once the represented 3D foot has been settled onto the ground plane 302, it is assumed that the heads of the first and fifth metatarsal bones should be on the ground plane, as well as the bottom of the heel. For example, FIG. 3 shows that the bottom 304 of the heel is resting on the ground plane 302.

The process 200 applies (at 208) Z-axis truncation to identify a portion of the plantar region of the foot. The portion of the plantar region that is identified satisfies a specified criterion, e.g., $Z \leq c$, where c is a predefined constant value that can be tuned (e.g., adjusted by a human or another entity such as a program or machine based on empirical data or other information). FIG. 3 shows a dashed line 306 that represents c, which is a height above the ground plane 302 (which is at Z=0, for example).

In some examples, c can be set to 1 millimeter or another value.

The Z-axis truncation includes selecting (at 208-1) vertices at the bottom surface of the represented foot 110 where $Z \leq c$ (i.e., the Z coordinates of these selected vertices is less than or equal to c). A "vertex" refers a surface location on the bottom surface of the represented foot 110. If a vertex at the bottom surface of the represented foot 110 is at a height (along the Z axis) that is equal to or less than c, then the vertex is selected by the Z-axis truncation.

Figure 4:
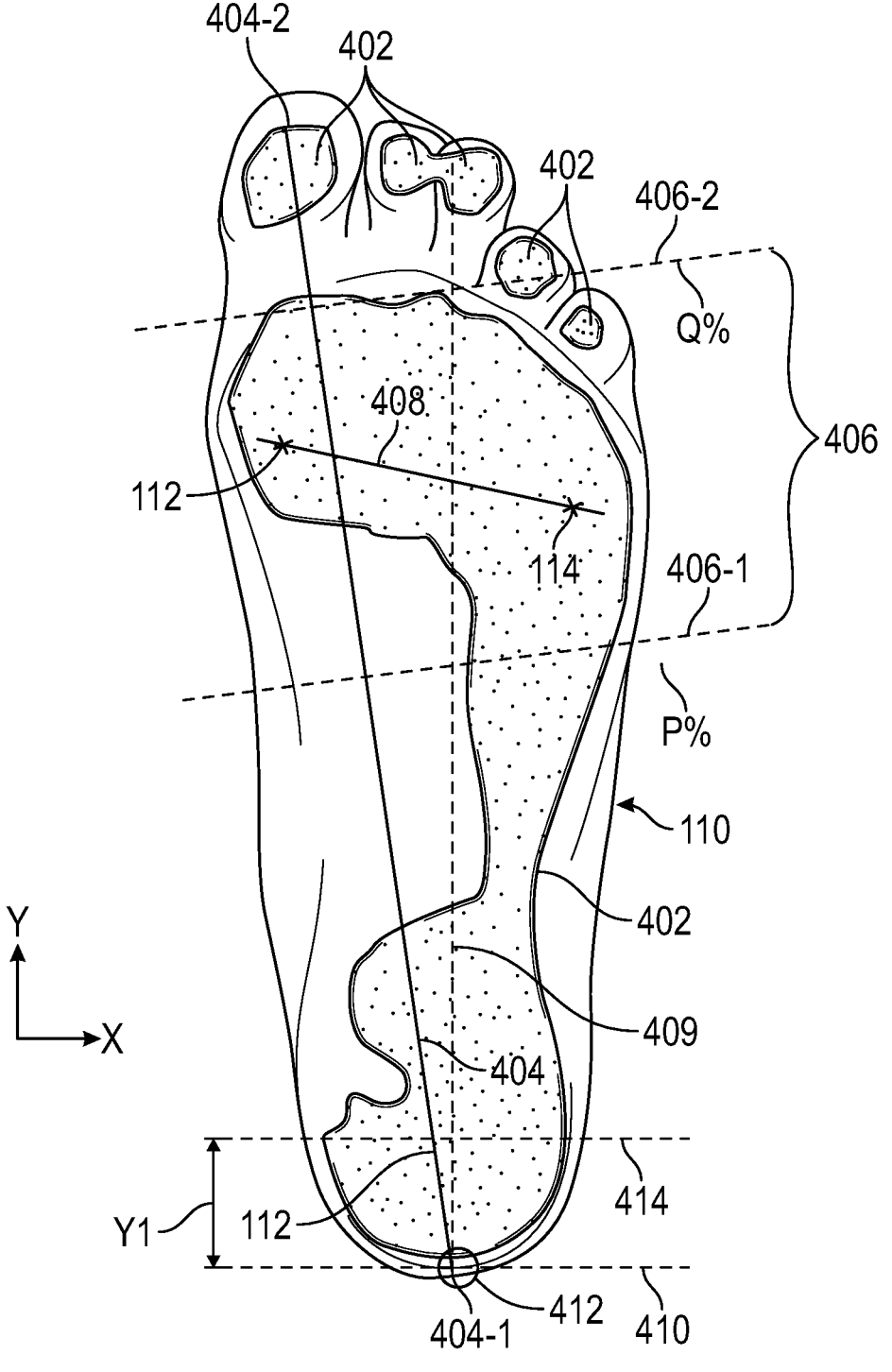
FIG. 4 is a bottom view of a foot used for identifying points according to some examples.

The Z-axis truncation includes projecting (at 208-2) the selected vertices onto the ground plane 302. Projecting a selected vertex onto the ground plane 302 refers to moving the selected vertex downwardly along the Z axis until the selected vertex is at Z=0. The selected vertices are included in a plantar profile 402 (with a dot pattern) in FIG. 4, where any selected vertex in the plantar profile 402 has been projected to Z=0.

The process 200 performs (at 210) metatarsal head location identification to extract the locations of the heads of the first and fifth metatarsal bones. The metatarsal head location identification determines (at 210-1) a length of the foot (referred to as "foot length 404") based on the selected vertices in the plantar profile 402. The foot length 404 is the distance between the most posterior (rearmost) location 404-1 of the plantar profile 402 and the most anterior (frontmost) location 404-2 of the plantar profile 402.

The metatarsal head location identification identifies (at 210-2) a front region 406 of the represented foot 110, where the front region 406 is defined between a first position that is P % of the foot length 404 as measured from the most posterior location 404-1, and a second position that is Q % of the foot length 404 as measured from the most posterior location 404-1. In some examples, P is 50, and Q is 85. In other examples, P and Q can have other values, which can be derived based on empirical data generated from analyses of human feet, for example.

The metatarsal head location identification identifies (at 210-3) the widest portion (represented by a width line 408 in FIG. 4) of the front region 406. The metatarsal head location identification determines (at 210-4) a width W of the width line 408.

The metatarsal head location identification identifies (at 210-5) metatarsal head points (e.g., the points 112 and 114) along the width line 408 at locations W/a and W/b, respectively, where a equals 6 and b equals 12, in some examples. In other examples, the parameters a and b can be set to different values, which can be based on empirical data generated from analyses of human feet, for example.

In some examples, the value of W is less than each of a and b, so that W/a and W/b are fractional values less than 1. W/a is thus a fraction of the width line 408 as measured from the rightmost point of the width line 408, and W/b is another fraction of the width line 408 as measured from the right-most point of the width line 408.

The points 112 and 114 represent the respective locations of the heads of the first and fifth metatarsal bones. It is noted that the head of the first metatarsal bone is more anterior along the Y axis (farther from the rear of the foot) as compared to the head of the fifth metatarsal bone.

The process 200 performs (at 212) heel identification to identify the locations of the back heel, the medial heel, and the lateral heel. The heel identification defines (at 212-1) a bisection line (409 in FIG. 4) that extends along the Y axis and is located half way between the points 112 and 114 (i.e., the bisection line 409 intersects a midpoint between the points 112 and 114).

The heel identification identifies (at 212-2) the intersection between the bisection line 409 and a posterior line 410 (along the X axis) that includes the most posterior location 404-1 of the plantar profile 402. The intersection point is represented by a circle 412 in FIG. 4. Note that the intersection point 412 is on the ground plane 302 (FIG. 3).

The heel identification identifies (at 212-3) a location of the back heel (e.g., the point 116) as a location that is a specified height H1 along the Z axis above the intersection point 412. In some examples, H1 is ⅜ inches or a different value, which can be selected based on an analysis of empirical data generated from analyses of human feet, for example.

The heel identification defines (at 212-4) a line 414 that is a specified distance Y1 along the Y axis from the posterior line 410. The specified distance Y1 can be 1 inch or a different value, which can be selected based on an analysis of empirical data generated from analyses of human feet, for example. As another example, the specified distance Y1 can be expressed as a percentage of the length of the represented foot 110.

The heel identification identifies (at 212-5) the point 118 corresponding to the medial heel (on the medial side of the represented foot 110), and identifies (at 212-6) the point 120 corresponding to the lateral heel (on the lateral side of the represented foot 110). Each of the points 118 and 120 are at the Y1 distance from the posterior line 410, and at the H1 height above the ground plane 302 (as depicted in FIG. 3).

Although FIG. 3 depicts an example in which the points 118 and 120 are at the same height as the point 116 corresponding to the back heel, it is noted that in other examples, the point 118 and/or the point 120 can be at a different height from the point 116.

The process 200 performs (at 214) an arch identification based on relationships between the point 112 representing the location of the head of the first metatarsal bone and the point 118 representing the location of the medial heel. The arch identification identifies (at 214-1) a projected point 130 on the bottom surface of the represented foot 110 that is X-axis aligned with the medial heel point 118 and that is on a line 132 that is parallel to the bisection line 409 of the represented foot 110 (as depicted in FIG. 1). The projected point 130 being X-axis aligned with the medial heel point 118 refers to the projected point 130 being shifted along the X axis to the lateral side of the represented foot 110 until the projected point 130 reaches the line 132.

The arch identification identifies (at 214-2) points 140 and 142 along the line 132, where the point 140 is at a location that is R % of the length of the line 132 as measured from the point 112, and the point 142 is at a location that is T % of the length of the line 132 as measured from the point 112. In some examples, R is 20 and T is 80; in other examples, other values of R and T can be used (which can be derived based on empirical data generated from analyses of human feet, for example). A region between the points 140 and 142 is a region where the highest part of the arch 124 is expected to be present.

The arch identification identifies (at 214-3) a connection line 134 connecting the point 112 and the point 118. The arch identification projects (at 214-4) vertical lines along the Z axis (e.g., vertical line 136) from the connection line 134. Each vertical line (e.g., 136) starts at the connection line 134 and ends when the vertical line reaches the surface of the arch 124 (which curves upwardly from the bottom of the represented foot 110). A comparison of the projected vertical lines can be used to determine which location of the arch 124 is at the highest elevation point (e.g., the longest vertical line of the projected vertical lines would correspond to the highest elevation point). Based on the projected vertical lines, the arch identification identifies (at 214-5) the highest elevation point of the arch 124. This highest elevation point is the location of the point 122.

Once the points 112, 114, 116, 118, 120, and 122 are identified, the process 200 generates (at 216) an output representation of features of the foot. The features can include information that includes coordinates of the points 112, 114, 116, 118, 120, and 122 (or a subset of these points). The output representation of the features of the foot can be in graphical form, in text form, or in a different form.

Figure 5:
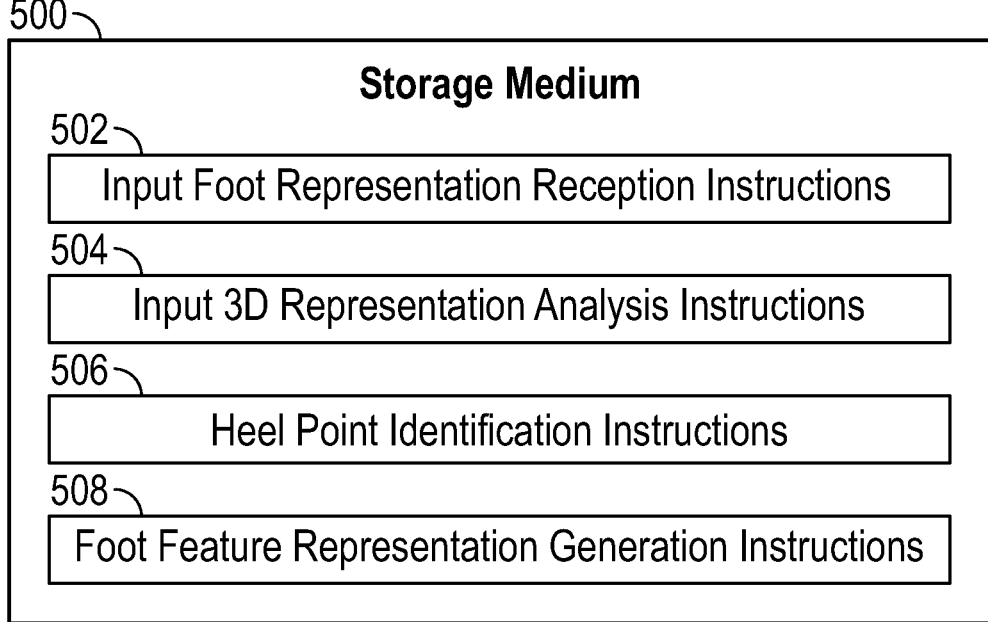
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can include a computer or multiple computers. The machine-readable instructions can be part of the foot features representation generation engine 102 of FIG. 1, for example.

The machine-readable instructions include input foot representation reception instructions 502 to receive an input 3D representation of a foot. The input 3D representation of the foot can include a representation of a single foot or both feet of a person.

The machine-readable instructions include input 3D representation analysis instructions 504 to analyze the input 3D representation of the foot to identify first points corresponding to metatarsal bones (e.g., first and fifth metatarsal bones) of the foot. Each first point can represent a location of the head of the respective metatarsal bone.

The machine-readable instructions include heel point identification instructions 506 to, based on locations of the first points corresponding to the metatarsal bones, identify a second point (e.g., 116, 118, or 120 in FIG. 1) corresponding to a heel of the foot.

The machine-readable instructions include foot feature representation generation instructions 508 to generate, based on the first points and the second point, a representation of features of the foot.

In further examples, the machine-readable instructions can identify the second point corresponding to the heel based on a line (e.g., the bisection line 409 of FIG. 4) that intersects a midpoint between the first points (e.g., the points 112 and 114 in FIG. 1).

In further examples, the machine-readable instructions can, in a specified front region (e.g., 406 in FIG. 4) of a sole of the foot, identify a width of a widest portion of the specified front region (e.g., along width line 408 of FIG. 4), and determine positions of the first points along the width.

In further examples, the second point corresponds to a back heel of the foot (e.g., 116 in FIG. 1), and the machine-readable instructions can identify, based on a location of the second point, further points corresponding to a medial heel and a lateral heel of the foot (e.g., 118 and 120 in FIG. 1).

In further examples, the machine-readable instructions can identify the further points based on determining locations of the further points that are a specified distance (e.g., the Y1 distance of FIG. 4) away from the second point corresponding to the back heel.

In further examples, the machine-readable instructions can re-orient (translate and/or rotate) the representation of the foot in the input 3D representation such that lowest portions of a sole of the foot are on a ground plane (e.g., 302 in FIG. 3). The first points are on the ground plane.

In further examples, the machine-readable instructions can, based on the locations of the first points and a location of the second point, identify an arch point (e.g., 122 in FIG. 1) on an arch of the foot.

In further examples, the second point corresponds to a back heel of the foot, and the machine-readable instructions can identify, based on a location of the second point, a medial heel point (e.g., 118 in FIG. 1) corresponding to a medial heel of the foot, where the arch point is identified based on the medial heel point.

In further examples, a given point of the first points corresponds to a first metatarsal bone. The machine-readable instructions can identify a region (e.g., the region between points 140 and 142 in FIG. 2) between the given point and a medial heel point along a length axis of the foot, and identify, within the identified region, a highest elevation point of a sole of the foot, where the arch point includes the highest elevation point.

In further examples, the region between the first point and the medial heel point along the length axis of the foot includes identifying a projected point (e.g., 130 in FIG. 1) that is aligned with the medial heel point along a width axis (e.g., X axis) of the foot, and a line (e.g., 132) is defined between the projected point and the first point. A central portion (e.g., the portion between points 140 and 142) of the line is identified, where the region identified above is in the central portion.

FIG. 6 is a flow diagram of a process 600 for building a footwear for a foot, according to some examples. The process 600 can be performed by the foot features representation generation engine 102 according to some examples.

The process 600 includes receiving (at 602) an input 3D representation of a foot acquired by a 3D scanner (e.g., 106 in FIG. 1).

The process 600 includes determining (at 604) a plantar surface of the foot in the input 3D representation. For example, the plantar surface can include selected vertices included in the plantar profile 402 of FIG. 4.

The process 600 includes identifying (at 606) first and second points (e.g., 112 and 114 in FIG. 1) on the plantar surface, the first and second points corresponding to heads of first and fifth metatarsal bones of the foot.

The process 600 includes identifying (at 608), based on first and second points, a heel point (e.g., 116 in FIG. 1) corresponding to a heel of the foot.

The process 600 includes identifying (at 610), based on the first point and the heel point, an arch point (e.g., 122 in FIG. 1) corresponding to an arch of the foot.

The process 600 includes generating (at 612) a representation of features of the foot, the features including the first and second points, the heel point, and the arch point.

Figure 7:
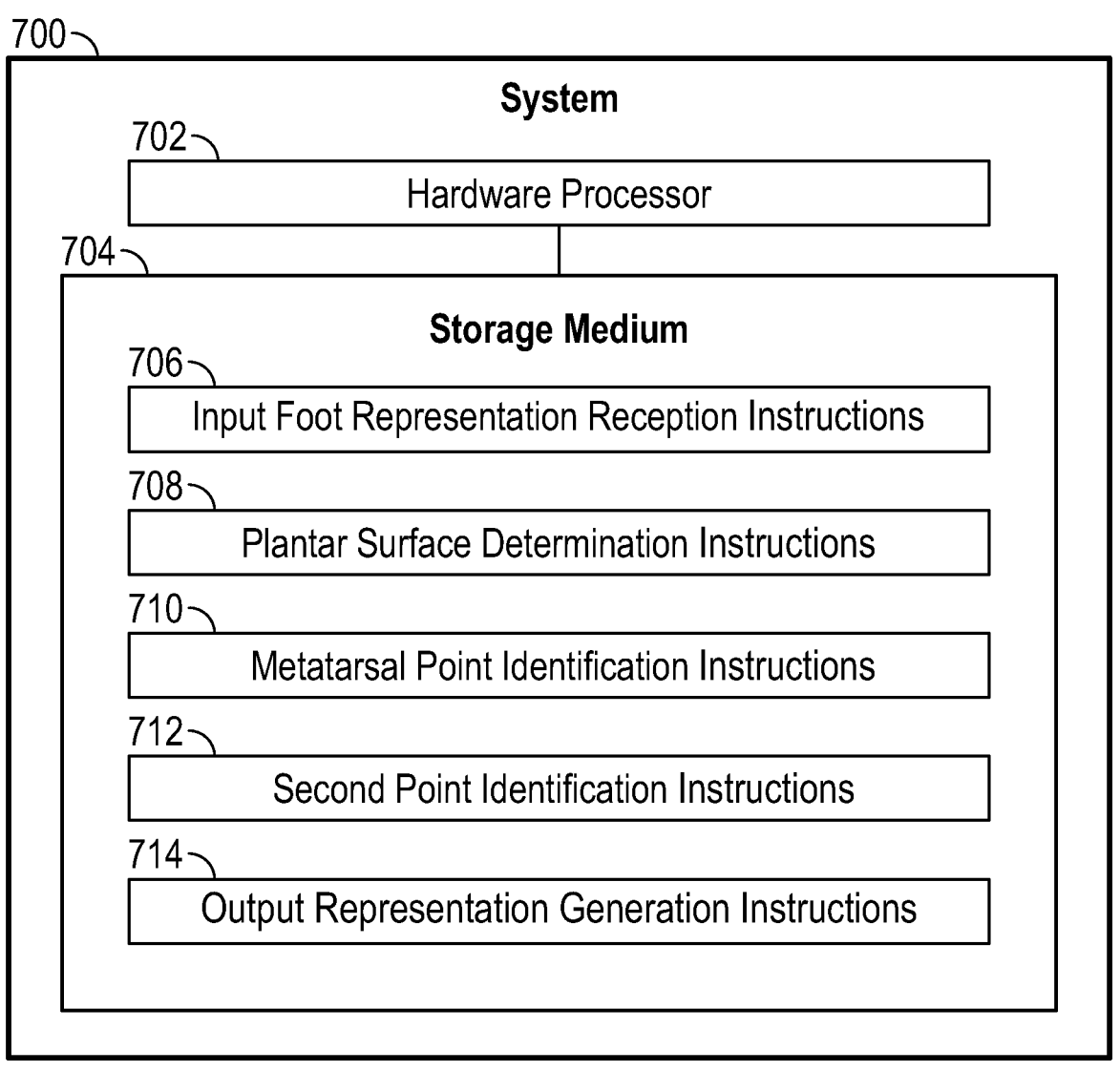
FIG. 7 is a block diagram of a system according to some examples.

FIG. 7 is a block diagram of a system 700 according to some examples. The system 700 can include a computer or a collection of multiple computers.

The system 700 includes a hardware processor 702 (or multiple hardware processors). A hardware processor can include a microprocessor, a core of a multi-core microprocessor, a microcontroller, a programmable integrated circuit, a programmable gate array, or another hardware processing circuit.

The system 700 further includes a storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions in the storage medium 704 include input foot representation reception instructions 706 to receive an input 3D representation of a foot.

The machine-readable instructions in the storage medium 704 include plantar surface determination instructions 708 to determine, based on the input 3D representation, a plantar surface of the foot.

The machine-readable instructions in the storage medium 704 include metatarsal point identification instructions 710 to identify first points representing locations of heads of metatarsal bones of the foot.

The machine-readable instructions in the storage medium 704 include second point identification instructions 712 to, based on locations of the first points, identify a second point representing a location of a portion of a heel of the foot, where the first points and the second point are on the plantar surface.

The machine-readable instructions in the storage medium 704 include output representation generation instructions 712 to generate, based on the first points and the second point, a representation of features of the foot.

A storage medium (e.g., 500 in FIG. 5 or 704 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EE-PROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

receiving, by a processor, an input three-dimensional (3D) representation of a foot;

analyzing, by the processor, the input 3D representation of the foot to identify first points based on positions along a width of a widest portion of a front region of a sole of the foot, the first points corresponding to first and fifth metatarsal bones of the foot, the positions determined based on the width and respective parameter values;

based on locations of the first points, identifying, by the processor, a second point corresponding to a heel of the foot; and generating, by the processor, based on the first points and the second point, a representation of features of the foot.

2. The method of claim 1, further comprising:

based on the locations of the first points and a location of the second point, identifying, by the processor, an arch point on an arch of the foot, wherein the representation of the features of the foot is further generated based on the arch point.

3. The method of claim 2, wherein the second point corresponds to a back heel part of the heel of the foot, and the method further comprises:

identifying, by the processor, based on the location of the second point, a medial heel point corresponding to a medial heel part of the heel of the foot, wherein the arch point is further identified based on the medial heel point.

4. The method of claim 1, wherein the second point is identified based on a line that intersects a midpoint between the first points.

5. The method of claim 4, wherein the second point corresponds to a back heel part of the heel of the foot, and the method further comprises:

identifying, by the processor, based on a location of the second point, further points corresponding to medial heel and lateral heel parts of the heel of the foot.

6. The method of claim 5, wherein the further points are identified based on locations a specified distance away from the second point.

7. The method of claim 1, further comprising:

re-orienting, by the processor, the input 3D representation such that lowest portions of the sole of the foot are on a ground plane, wherein the first points are on the ground plane.

8. The method of claim 7, further comprising:

identifying, by the processor, a region between the first point corresponding to the first metatarsal bone and a medial heel point corresponding to a medial heel part of the heel of the foot, along a length axis of the foot; and identifying, by the processor, a highest elevation point of the sole of the foot within the region, an arch point of an arch of the foot comprising the highest elevation point.

9. The method of claim 8, wherein the region between the given first point corresponding to the first metatarsal bone and the medial heel point along the length axis of the foot is identified by:

identifying a projected point aligned with the medial heel point along a width axis of the foot;

defining a line between the projected point and the first point corresponding to the first metatarsal bone; and identifying a central portion of the line, the region being in the central portion.

10. The method of claim 1, further comprising:

outputting, by the processor, the representation of the features of the foot.

11. The method of claim 1, further comprising:

forming footwear customized for the foot based on the representation of the features of the foot.

12. A method comprising:

receiving, by a processor, an input three-dimensional (3D) representation of a foot;

analyzing, by the processor, the input 3D representation of the foot to identify first points corresponding to a first metatarsal bone and one or more other metatarsal bones of the foot;

based on locations of the first points, identifying, by the processor, a second point corresponding to a medial heel portion of a heel of the foot;

identifying, by the processor, a projected point aligned with the second point along a width axis of the foot;

identifying, by the processor, a region within a central portion of a line between the first point corresponding to the first metatarsal bone and the projected point aligned with the second point along the width axis of the foot;

identifying, by the processor, an arch point corresponding to an arch of the foot, as a highest elevation point of a sole of the foot within the region; and generating, by the processor, based on the first points, the second point, and the arch point, a representation of features of the foot.

13. The method of claim 12, further comprising:

identifying a back heel point corresponding to a back heel portion of the heel of the foot, based on a line intersecting a midpoint between the first points.

14. The method of claim 13, further comprising:

identifying, by the processor, based on a location of the back heel point, a lateral heel point corresponding to a lateral heel portion of the heel of the foot.

15. The method of claim 14, wherein the lateral heel point is identified based on a location a specified distance away from the back heel point.

16. The method of claim 12, further comprising:

re-orienting, by the processor, the input 3D representation such that lowest portions of the sole of the foot are on a ground plane, wherein the first points are on the ground plane.

17. The method of claim 12, further comprising:

outputting, by the processor, the representation of the features of the foot.

18. The method of claim 12, further comprising:

forming footwear customized for the foot based on the representation of the features of the foot.

* * * * *